US008681482B2

(12) United States Patent
Srikantaiah et al.

(10) Patent No.: US 8,681,482 B2
(45) Date of Patent: Mar. 25, 2014

(54) APPARATUS FOR ENCLOSING A SWITCHING ASSEMBLY IN AN AUTOMATIC TRANSFER SWITCH

(75) Inventors: Suresh Srikantaiah, Hyderabad (IN); Arthur Michael Evans, Chicago, IL (US); Sudarshan Allada, Hyderabad (IN); Pravin Pralhad Kulkarni, Hyderabad (IN)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 13/353,964

(22) Filed: Jan. 19, 2012

(65) Prior Publication Data
US 2013/0188298 A1 Jul. 25, 2013

(51) Int. Cl.
*H02B 1/32* (2006.01)

(52) U.S. Cl.
USPC ........... 361/643; 361/605; 361/631; 361/641; 361/634; 361/676; 361/837; 174/50; 174/50.52; 174/520; 218/1; 218/15; 218/34; 218/149; 218/156; 200/15; 200/293; 200/260; 200/304; 220/4.21; 220/3.6; 220/3.7

(58) Field of Classification Search
USPC ........ 361/605, 616, 622, 627, 630, 631, 634, 361/641, 643, 658, 676, 823–828, 837; 174/17 CT, 18, 50, 50.52, 520; 312/223.2; 454/184; 200/15, 255, 16 D, 200/293, 260, 304, 305, 244; D13/160; 218/1, 15, 34, 144, 149, 152, 156, 157, 218/158, 41; 220/3.6
See application file for complete search history.

(56) References Cited

U.S. PATENT DOCUMENTS

| 3,368,397 | A |   | 2/1968  | Wochna            |         |
|-----------|---|---|---------|-------------------|---------|
| 3,402,273 | A |   | 9/1968  | Davis             |         |
| 4,110,584 | A | * | 8/1978  | Erickson et al.   | 200/304 |
| 4,233,482 | A | * | 11/1980 | DiMarco et al.    | 200/255 |
| 4,405,846 | A |   | 9/1983  | Belttary          |         |
| 4,480,161 | A |   | 10/1984 | Kellogg et al.    |         |
| 4,617,540 | A |   | 10/1986 | Westermeyer       |         |
| 4,639,564 | A |   | 1/1987  | Grunert et al.    |         |
| 4,699,289 | A | * | 10/1987 | You               | 220/3.7 |
| 4,778,959 | A | * | 10/1988 | Sabatella et al.  | 218/1   |
| 5,243,161 | A | * | 9/1993  | Cox et al.        | 200/308 |
| 5,473,129 | A | * | 12/1995 | Markowski et al.  | 200/293 |
| 5,499,734 | A | * | 3/1996  | Tessmer           | 220/4.21|
| D380,198  | S | * | 6/1997  | Clark et al.      | D13/160 |
| 5,914,460 | A | * | 6/1999  | Mowery et al.     | 174/50  |
| 5,945,650 | A | * | 8/1999  | Holland et al.    | 218/1   |

(Continued)

FOREIGN PATENT DOCUMENTS

JP 02000340082 A * 12/2000 ............. H01H 50/02

*Primary Examiner* — Michail V Datskovskiy
(74) *Attorney, Agent, or Firm* — Hiscock & Barclay LLP

(57) ABSTRACT

This disclosure describes examples of an apparatus to enclose components of a switching assembly of an automatic transfer switch. In one embodiment, the apparatus, or arc chamber cover, has a housing made of material with optical properties that permit observation of the interior of the housing. A mounting assembly couples to the housing. The mounting assembly secures the apparatus to the automatic transfer switch. In one example, the mounting assembly comprises feet comprising a material with mechanical properties that can withstand pressure and other forces inside of the interior chamber. The apparatus also includes one or more baffles to control the flow of gasses and control electric arcs within the switching assembly.

20 Claims, 3 Drawing Sheets

(56) References Cited

U.S. PATENT DOCUMENTS

| | | |
|---|---|---|
| 6,407,354 B1 | 6/2002 | Turner et al. |
| 6,825,431 B2 | 11/2004 | Azzola et al. |
| 7,265,311 B1 | 9/2007 | Schaltenbrand et al. |
| 7,982,578 B2 * | 7/2011 | Buettner ................ 337/196 |

* cited by examiner

APPARATUS FOR ENCLOSING A SWITCHING ASSEMBLY IN AN AUTOMATIC TRANSFER SWITCH

BACKGROUND OF THE INVENTION

The subject matter disclosed herein relates to electrical power transfer and, more particularly, to embodiments of an arc chamber cover for enclosing a switching assembly in an automatic transfer switch.

An automatic transfer switch provides a continuous source of power for critical loads by automatically transferring from a normal power source to an emergency power source when the normal power source falls below a preset limit. Automatic transfer switches are found in hospitals, military installations, industrial sites, and commercial buildings where even brief power interruptions are costly. Typical automatic transfer switches include a plurality of mechanical switching assemblies controlled to minimize any interruptions during switching operations.

Control of the switching components occurs through a series of sensing relays, transformers, and actuators, such as solenoids or linear motors to facilitate timely transfer from normal to emergency power. The solenoid actuators energize until the controller senses that the switching component moves to its desired position. Typically, a plurality of limit switches provides a signal to the controller that switching is complete. Proper alignment of the limit switches facilitates a longer lasting automatic transfer switch because when the solenoid is energized, but the limit switch fails to actuate because of misalignment, the solenoid will energize for a prolonged period of time which may damage the solenoid.

Actuation of the contact assemblies in the switching assembly of an automatic transfer switch can cause arcing to occur. Arcing generates a large amount of heat, which rapidly increases the temperature of the air surrounding the contact assemblies. For protection and to afford a level of safety, the automatic transfer switch includes covers (e.g., arc chamber covers) that surround the switching assemblies to contain the arcing, and its by-products, within a closed environment.

The discussion above is merely provided for general background information and is not intended to be used as an aid in determining the scope of the claimed subject matter.

BRIEF DESCRIPTION OF THE INVENTION

This disclosure describes examples of an apparatus to enclose components of a switching assembly of an automatic transfer switch. In one embodiment, the apparatus, or arc chamber cover, has a housing made of material with optical properties that permit observation of the interior of the housing. A mounting assembly couples to the housing. The mounting assembly secures the apparatus to the automatic transfer switch. In one example, the mounting assembly comprises feet comprising a material with mechanical properties that can withstand pressure and other forces inside of the interior chamber. The apparatus also includes one or more baffles to control the flow of gasses and control electric arcs within the switching assembly. An advantage of some disclosed embodiments of the apparatus is to prevent mechanical failure of the apparatus, while permitting inspection of the components of the automatic transfer switches without having to displace the apparatus from its mounted position. Another advantage of the practice of some disclosed embodiments is to improve the safety and lifespan of an automatic transfer switch by controlling the flow of gasses and controlling electric arcs within the switching assembly.

In one embodiment, the disclosure describes an apparatus to enclose a switching assembly of an automatic transfer switch. The apparatus comprises a housing forming an interior chamber that surrounds components of the switching assembly, the housing comprising a first material having optical properties that permit visual inspection of the components of the switching assembly in the interior chamber, a mounting assembly disposed on either side of the housing, the mounting assembly comprising a second material having mechanical properties that are different from the first material, and a baffle assembly disposed in the interior chamber.

In another embodiment, the disclosure describes a cover to enclose a switching assembly of an automatic transfer switch having an arc chute assembly. The cover comprises a body with a top cover panel and side cover panels forming an interior chamber to enclose components of the switching assembly, a first foot and a second foot disposed on the side cover panels, the first foot and the second foot each comprising an upright portion coupled to the side cover panels and a mounting portion extending under the side cover panels and into the interior chamber, and a baffle assembly disposed in the interior chamber, the baffle assembly comprising a pair of cooling baffles proximate ends of the body and a pair of intermediate baffles spaced longitudinally interior to the cooling baffles, the intermediate baffles having an opening that aligns with the art chute assembly when the cover encloses the switching assembly of the automatic transfer switch.

In yet another embodiment, the disclosure describes a cover to enclose a switching assembly of an automatic transfer switch having an arc chute assembly. The cover comprise a housing forming an interior chamber to enclose components of the switching assembly of an automatic transfer switch, and a baffle assembly disposed in the interior chamber, the baffle assembly comprising a pair of cooling baffles proximate ends of the body and a pair of intermediate baffles spaced longitudinally interior to the cooling baffles, the intermediate baffles having an opening that aligns with the art chute assembly when the cover encloses the switching assembly of the automatic transfer switch.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
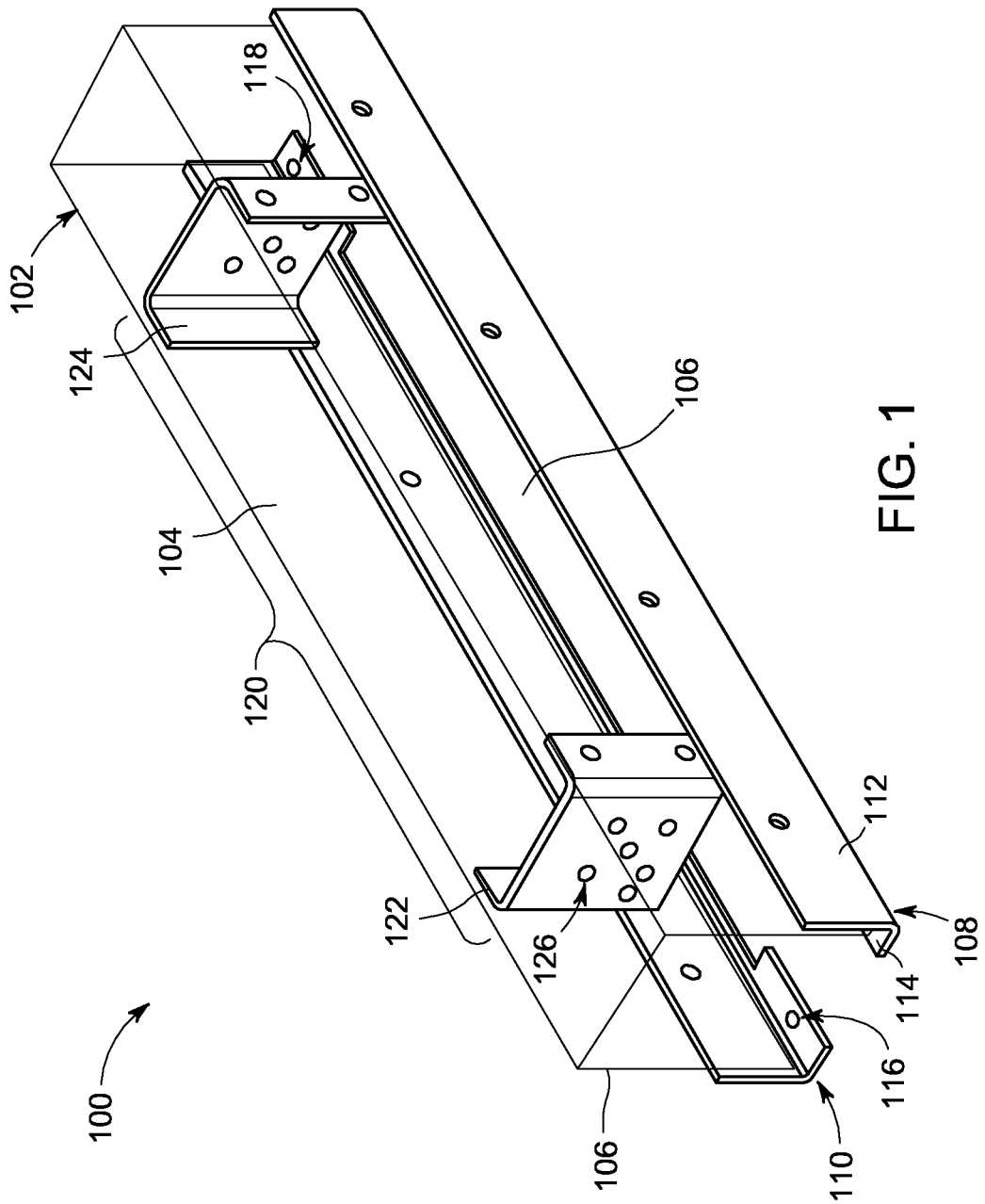
FIG. 1 depicts a perspective view of an exemplary embodiment of an apparatus that encloses a switching assembly of an automatic transfer switch.

FIG. 1 illustrates an exemplary embodiment of an apparatus 100 (also "cover 100") that encloses a switching assembly of an automatic transfer switch. The cover 100 permits inspection and observation of the contact assemblies of the switching assembly without the need to displace any portion of the cover 100 from its position over the switching assembly. Construction of the cover 100 also prevents mechanical failure of the cover 100 in connection with extreme operating conditions the switching assembly causes, e.g., during transfer of loading from a main power supply to an auxiliary power supply.

In the present example, the cover 100 includes a housing 102 with a U-shaped body forming an interior chamber that, when the cover 100 is in position, surrounds the switching assembly. The U-shaped body includes a forward cover panel 104 and side cover panels 106 that form a box-like structure. The ends of the box-like structure can remain open or can have additional top and bottom cover panels (not shown). The cover 100 also includes a mounting assembly in the form of feet (e.g., a first foot 108 and a second foot 110) that couple to the side cover panels 106. The feet are useful to secure the cover 100 to the switching assembly. In one example, the feet comprise an L-shaped channel with an upright portion 112, which attaches to the side cover panels 106, and a mounting portion 114 that extends under the lower edges of the side cover panels 106 into the interior chamber. Although not shown in FIG. 1, spacers or other elements may reside between the upright portion 112 and the side cover panels 106 to locate features that ensure proper mounting of the cover 100 onto the switching assembly. The mounting portion 114 includes slots (e.g., slots 116 and slots 118) that secure the cover 100 to fasteners on the switching assembly. For example, the slots can comprise a keyhole slot, e.g., with an upper portion and a lower portion that permit the cover 100 to slide over and engage a shoulder on the fasteners.

The cover 100 also includes a baffle assembly 120 with one or more baffle members disposed in the interior chamber. The baffle members can include cooling baffles (e.g., a lower cooling baffle 122 and an upper cooling baffle 124) with a cooling feature 126 that permits movement of air through the baffle member towards the top and bottom ends of the cover 100. The cooling baffles are spaced apart from one another to accommodate components of the switching assembly therebetween. The cooling features 126 can include apertures, holes, and openings that perforate the baffle member to allow high temperature gasses (e.g., air) to escape from the interior chamber. These high temperature gasses often arise during actuation of the switching assembly, which can generate an arc that rapidly raises the temperature of gasses inside of the housing 102.

The U-shaped body can comprise one or more materials (also a "first material") with optical properties that permit observation of components of the switching assembly when the cover 100 is in position over the switching assembly. These materials can form, in whole or in part, the forward cover panel 104 and one or more of the side cover panels 106. Exemplary materials are transparent and/or translucent and, in one example, the materials have a level of transparency that permits sufficient light to transmit through the housing 102 to illuminate the interior chamber. In one embodiment of the cover 100, the U-shaped body comprises polycarbonate (e.g., LEXAN®) or other thermoplastics and related composites. These materials have optical properties that allow viewing of the interior chamber and the components of the switching assembly that reside therein.

The feet can comprise one or more materials (also a "second material") with mechanical properties (e.g., strength, stiffness, etc.) that can withstand high pressure and other forces that can occur within the interior chamber of the cover 100. The second material can comprise high-strength plastics and polymers, and related materials and composites thereof. These materials can be opaque, partially transparent or translucent, and/or transparent or translucent. In one embodiment of the cover 100, the feet comprise a glass-polyester laminate material also known as GLASTIC® (and/or GPO3). In one embodiment, the baffle members can comprise the same material (e.g., the second material) that is used to construct the feet.

One or more components of the cover 100 can be formed monolithically and/or as an assembly of pieces that fasten together using known fasteners (e.g., bolts, screws, etc.) and fastening techniques (e.g., adhesives, welding, etc.). The present disclosure likewise contemplates the use of various manufacturing techniques (e.g., extruding, molding, machining, milling, turning, etc.) to fabricate components of the U-shaped body, the feet, and/or the baffle members. In one exemplary construction of the cover 100, the housing 102 may comprise a single, molded piece on which the feet are secured, e.g., with screws, bolts, adhesives, etc. Alternative fastening methods may be used that are compatible with the materials of construction, e.g., LEXAN® and GLASTIC®. In another exemplary construction, the feet (and/or portions of the feet) may be formed integrally with the housing 102, wherein such construction maintains the optical properties and mechanical properties of the housing 102 and the feet as contemplated herein.

As FIG. 1 shows, the feet can extend along the entire length of the side cover panels 106. This configuration may add strength and stiffness to the side cover panels 106. However, the present disclosure also contemplates embodiments of the cover 100 where the feet extend only along a portion of the side panels 106. For example, the feet may reside proximate the ends of the U-shaped body and extend longitudinally along only a portion of the side cover panel 106. In still other examples, the feet may comprise a plurality of sections that reside in spaced relation to one another along the length of the side cover panels. These sections may have a slot that secures to corresponding fasteners on the switching assembly.

Figure 2:
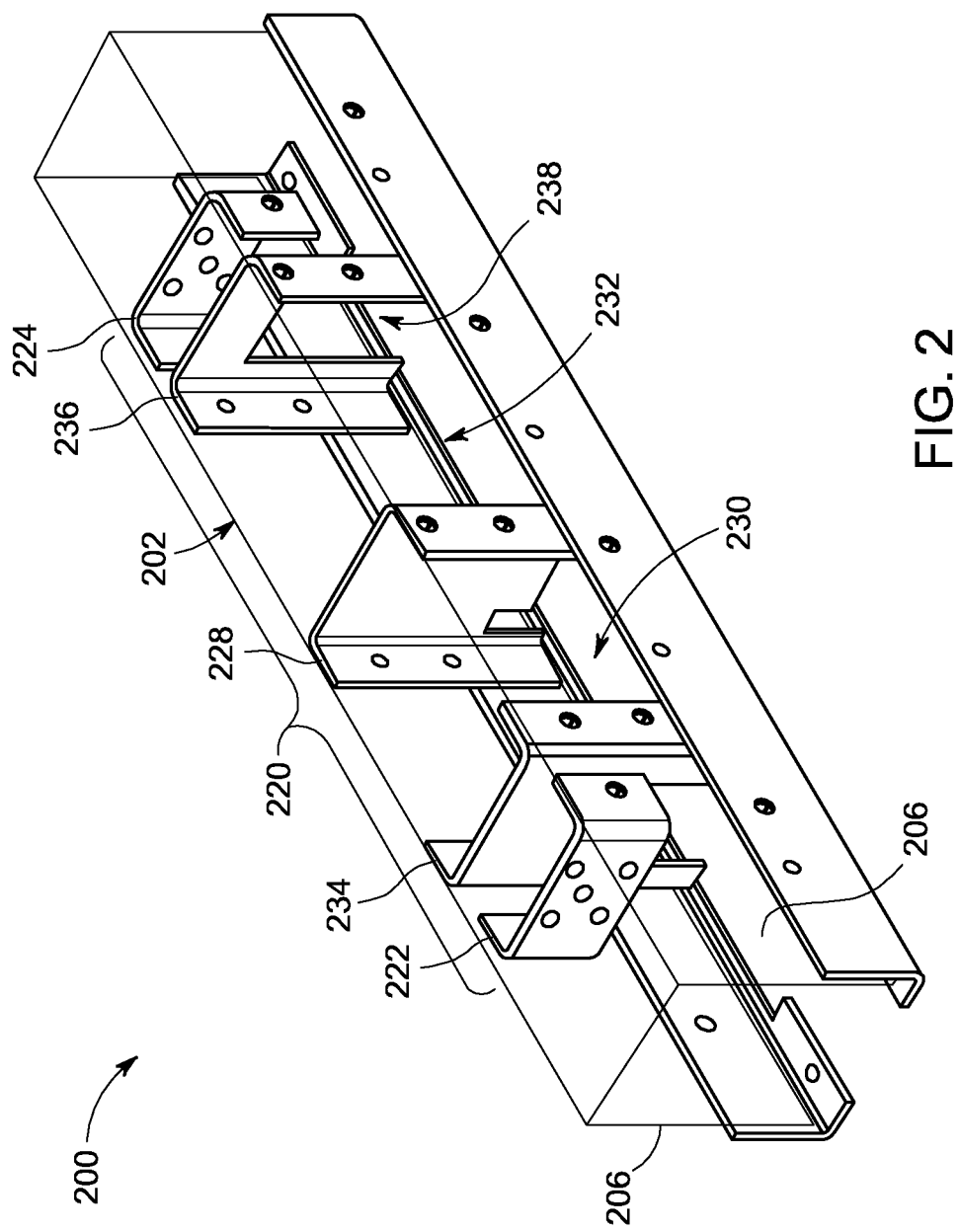
FIG. 2 depicts a perspective view of another exemplary embodiment of an apparatus that encloses a switching assembly of an automatic transfer switch.

FIG. 2 depicts another exemplary embodiment of an apparatus 200 (also a "cover 200") that permits viewing of the contact assemblies of the switching assembly of an automatic transfer switch. The cover 200 includes a housing 202 and a baffle assembly with baffle members including cooling baffles (e.g., a lower cooling baffle 222 and an upper cooling baffle 224). The baffle members also includes one or more central baffles (e.g., a central baffle 228), which separates the interior chamber into a lower chamber 230 and an upper chamber 232, and intermediate baffles (e.g., a lower intermediate baffle 234 and an upper intermediate baffle 236). The intermediate baffles 234, 236 reside proximate the cooling baffles and have an opening 238 with a size and shape to accommodate one or more components of the switching assembly. In one embodiment, the intermediate baffles 234, 236 are spaced forward, towards the central baffle 238, a distance that maintains appropriate cooling and exhaust of gasses from the interior chamber via the cooling baffles 222, 224.

As FIG. 2 illustrates, the baffle members (e.g., the cooling baffles 222, 224, the central baffle 228, and the intermediate baffles 234, 236) comprise a C-shaped channel with an elongated member and two shorter, side members. The elongated member traverses at least a portion of the interior chamber. In the present example, the elongated member traverses across the interior chamber to position the side members proximate the inner walls of the side cover panels 206. The side members may have mounting holes and/or mounting features to receive fasteners, e.g., one or more bolts that penetrate the side cover panels 206. In one construction of the cover 200, adhesive secures the side members to the inner surface of the side cover panels 206.

The baffles can comprise a variety of materials including the first material and the second material discussed above. Suitable materials have properties, for example, that are both insulative and mechanically able to withstand the operating conditions in the interior chamber. In one embodiment of the cover 200, one or more of the baffle members comprise GLASTIC® and, in one example, the cooling baffles, the central baffle, and the intermediate baffle all comprise GLASTIC® and/or have a similar laminated material structure.

Figure 3:
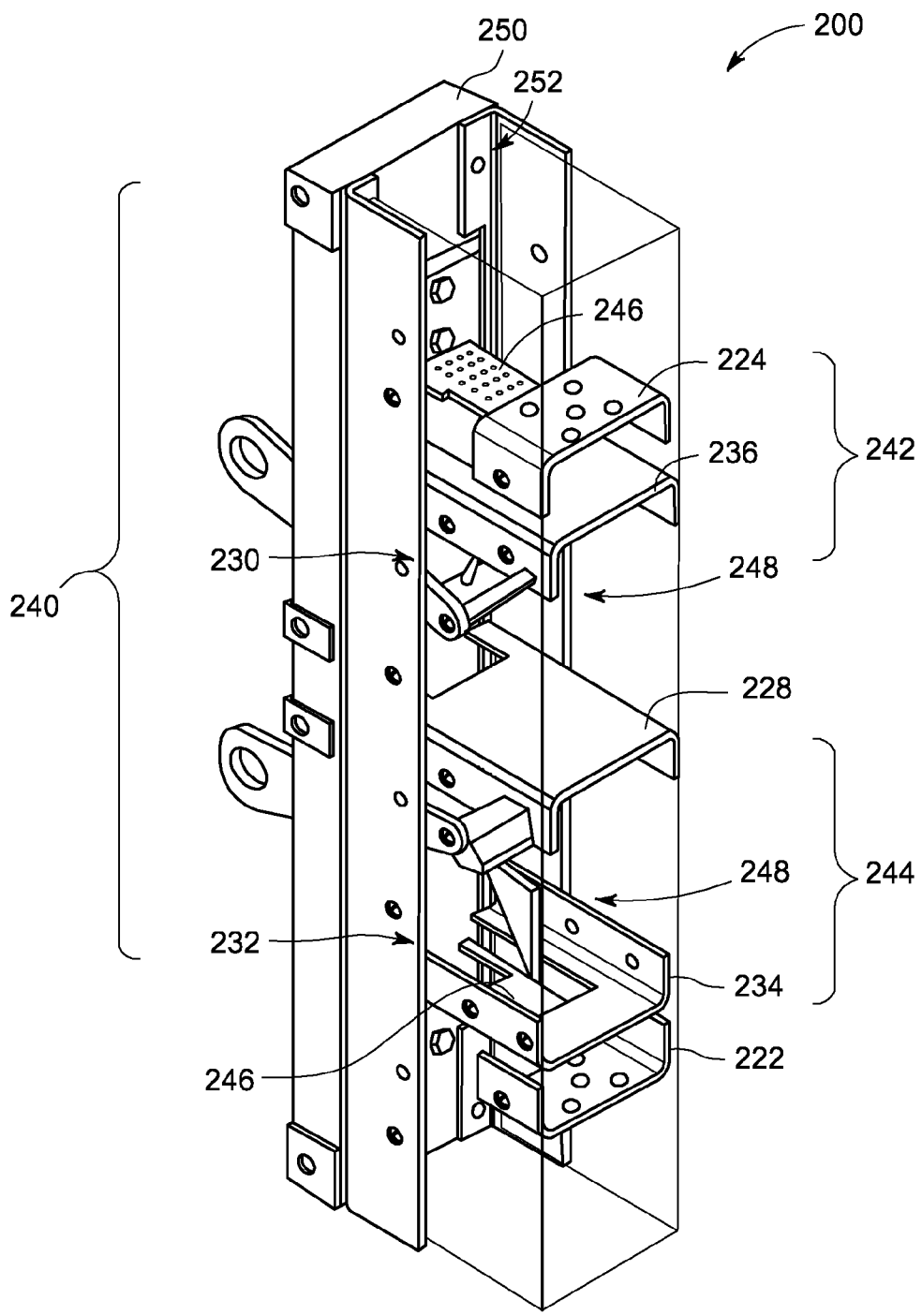
FIG. 3 depicts a perspective view of the apparatus of FIG. 2 in a mounted configuration enclosing a switching assembly on an automatic transfer switch.

FIG. 3 illustrates the cover 200 in position over a switching assembly 240 in an automatic transfer switch. In the present example, the switching assembly 240 includes a plurality of source switches (e.g., a primary source switch 242 and a secondary source switch 244) that enable the switching assembly 240 to couple power from different sources. The source switches include a number of components including an arc chute assembly 246 and a contact assembly 248. A base plate 250 on the automatic transfer switch supports the components of the source switches 242, 244. The base plate 250 may include one or more fasteners, generally identified by the number 252, to support the cover 200, as discussed more below.

Mounting the cover 200 positions the upper chamber 230 and the lower chamber 232 about, respectively, the contact assemblies 248 of the primary source switch 242 and the secondary source switch 244. In one embodiment of the cover 200, keyhole slots on the cover 200 align with and rest on the fasteners 252 of the base plate 250 of the automatic transfer switch. Access to the source switches 242, 244, when appropriate, requires only that an end user (e.g., a technician) displace the cover 200 in an upward manner to dislodge the cover 200 from the fasteners 252.

The central baffle 228 separates the primary source switch 242 from the secondary source switch 244, but does not interfere with action of the contact assemblies 248 of the switching assembly 240 to connect and disconnect primary and secondary power sources. This configuration prevents gasses from permeating throughout the entire interior chamber of the cover 200 and, therefore, reduces cross-contamination between the upper chamber 230 and the lower chamber 232. For example, arcing of the contact assembly 248 in either of the source switches 242, 244 can generate gasses and contaminants that can disrupt operation of the other source switch. When the cover 200 is in place, however, the central baffle 228 acts to hinder diffusion of these gasses and contaminants to the adjacent chamber.

The intermediate baffles (also "arc chute baffles") 236, 238 reside proximate the arc chute assemblies 246. The intermediate baffles helps to control the electric arc that occurs when the contact assembly 248 rapidly opens to the arc chute assembly 246, which confines and/or extinguishes the electric arc. As shown in FIG. 3, in one embodiment of the cover 200, the opening 238 in the intermediate baffles 236, 238 aligns with the corresponding arc chute assembly 246.

In view of the foregoing, an exemplary construction is provided below to highlight the features of one embodiment of a cover (e.g., the cover 100 of FIG. 1 and the cover 200 of FIGS. 2 and 3). However, although the discussion below provides certain details and dimensions for such construction, these details are merely illustrative of one or more embodiments of the present disclosure.

In one exemplary construction, a cover comprises a transparent U-shaped LEXAN® 9034 body (of about 3 mm thick) and a pair of L-shaped GLASTIC® feet (of about 5 mm thick). A GLASTIC® spacer (of about 3 mm thick) is positioned in between the body and the feet. The cover also comprises a plurality of c-channel GLASTIC® baffles (of about 5 mm thick). The body, the feet, the spacers, and the baffles are assembled to form the cover using a plurality of polycarbonate plastic screws (e.g., ¼-20 screws).

As used herein, an element or function recited in the singular and proceeded with the word "a" or "an" should be understood as not excluding plural the elements or functions, unless such exclusion is explicitly recited. Furthermore, references to "one embodiment" of the claimed invention should not be interpreted as excluding the existence of additional embodiments that also incorporate in the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus to enclose a switching assembly of an automatic transfer switch, the apparatus comprising:
   a housing forming an interior chamber that surrounds components of the switching assembly, the housing comprising a first material having optical properties that permit visual inspection of the components of the switching assembly in the interior chamber;
   a mounting assembly disposed on either side of the housing, the mounting assembly comprising a second material having mechanical properties that are different from the first material; and
   a baffle assembly disposed in the interior chamber.

2. The apparatus of claim 1, wherein the housing comprises a body having a top cover panel and side cover panels, wherein the mounting assembly fastens to the side cover panels.

3. The apparatus of claim 1, wherein the first material comprises polycarbonate.

4. The apparatus of claim 1, wherein the second material comprises a glass-polyester laminate material.

5. The apparatus of claim 1, wherein the mounting assembly comprises a first portion secured to the housing and a second portion extending under the housing and into the interior chamber.

6. The apparatus of claim 1, wherein the baffle assembly separates the interior chamber into an upper chamber and a lower chamber.

7. The apparatus of claim 1, wherein the baffle assembly comprises a baffle member with an elongated member traversing a portion of the interior chamber and side members that secure the baffle member to the housing.

8. The apparatus of claim 1, wherein the baffle assembly comprises the second material.

9. A cover to enclose a switching assembly of an automatic transfer switch having an arc chute assembly, the cover comprising:
- a body with a top cover panel and side cover panels forming an interior chamber to enclose components of the switching assembly;
- a first foot and a second foot disposed on the side cover panels, the first foot and the second foot each comprising an upright portion coupled to the side cover panels and a mounting portion extending under the side cover panels and into the interior chamber; and
- a baffle assembly disposed in the interior chamber, the baffle assembly comprising a pair of cooling baffles proximate ends of the body and a pair of intermediate baffles spaced longitudinally interior to the cooling baffles, the intermediate baffles having an opening that aligns with the art chute assembly when the cover encloses the switching assembly of the automatic transfer switch.

10. The cover of claim 9, wherein the top cover panel comprises polycarbonate having optical properties that permit visual inspection of the components of the switching assembly in the interior chamber.

11. The cover of claim 9, wherein the feet comprise a glass-polyester laminate material.

12. The cover of claim 9, wherein the baffle assembly forms an upper chamber and a lower chamber in the interior chamber, and wherein the upper chamber and the lower chamber receive the components of the switching assembly of the automatic transfer switch therein.

13. The cover of claim 9, wherein the first foot and the second foot extend along the entire length of the side cover panels.

14. A cover to enclose a switching assembly of an automatic transfer switch having an arc chute assembly, the cover comprising:
- a housing forming an interior chamber to enclose components of the switching assembly of an automatic transfer switch; and
- a baffle assembly disposed in the interior chamber, the baffle assembly comprising a pair of cooling baffles proximate ends of the body and a pair of intermediate baffles spaced longitudinally interior to the cooling baffles, the intermediate baffles having an opening that aligns with the art chute assembly when the cover encloses the switching assembly of the automatic transfer switch.

15. The cover of claim 14, wherein the baffle assembly further comprises a central baffle that forms an upper chamber and a lower chamber in the interior chamber, wherein the upper chamber and the lower chamber receive components of the switching assembly of the automatic transfer switch therein.

16. The cover of claim 14, wherein the cooling baffles are perforated.

17. The cover of claim 14, wherein the baffles comprise a an elongated member that traverses the interior chamber and side members that secure the elongated member to the housing.

18. The cover of claim 14, wherein the baffles comprise a material that is different than the material of the housing.

19. The cover of claim 14, wherein the housing comprises polycarbonate.

20. The cover of claim 14, wherein the baffles comprise a glass-polyester laminate material.

* * * * *